(No Model.)

W. CALHOUN.
METALLIC BUNG BUSH.

No. 322,255. Patented July 14, 1885.

Witnesses:
Frank E. Selkirk
Alex. Selkirk Jr

Walter Calhoun
Inventor.
By his Atty
Alex. Selkirk

United States Patent Office.

WALTER CALHOUN, OF WEST TROY, ASSIGNOR OF ONE-HALF TO JOHN PENNIE, JR., OF ALBANY, NEW YORK.

METALLIC BUNG-BUSH.

SPECIFICATION forming part of Letters Patent No. 322,255, dated July 14, 1885.

Application filed February 5, 1884. (No model.)

*To all whom it may concern:*

Be it known that I, WALTER CALHOUN, a citizen of the United States, residing at West Troy, in the county of Albany and State of New York, have invented certain new and useful Improvements in Metallic Bung-Bushes, of which the following is a specification.

My invention relates to certain new and useful improvements in bung-bushes, of which the following is a full and correct description, reference being had to the accompanying drawings, wherein—

Figure 1:
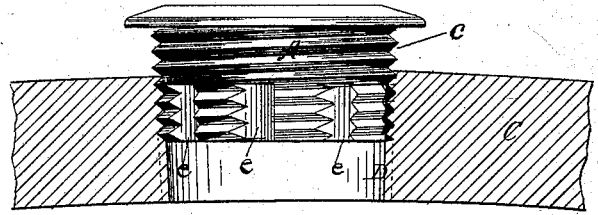
Figure 2:
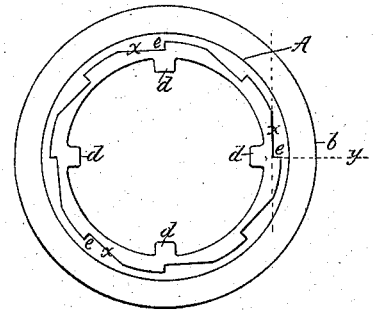
Figure 3:
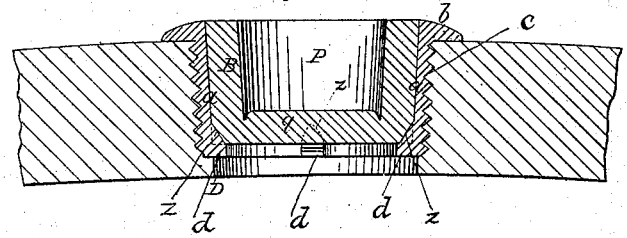
Figure 4:
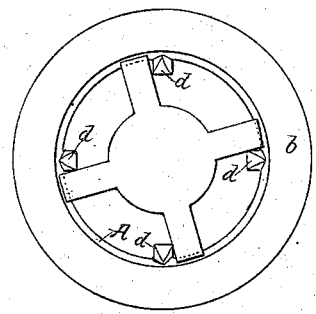

Figure 1 is a side elevation of my improved bush partly inserted in the bung-hole of a vessel, the wood of which is shown in section. Fig. 2 is a bottom plan view of the bush. Fig. 3 is a sectional view of a vessel-stave with the bush inserted in place therein and the bung or plug closing the bushing. Fig. 4 is a plan view of the bush with a dimension-wrench in engagement therewith.

Similar letters of reference indicate similar parts throughout the several views.

In the drawings, A represents my improved bung-bush, and B the bung closing the same.

C represents the stave of a vessel, and D the bung-hole made therein to receive the bushing.

The bung-bush A is provided with a wall, $a$, about one-sixteenth of an inch in thickness exclusive of the screw-threads, which wall has both a tapering bore and tapering exterior, as shown, for instance, in Letters Patent No. 85,903, granted to myself January 19, 1869. It is provided with the stiffening-flange $b$ at its upper end.

Upon the tapering exterior of wall $a$ is the screw-thread $c$, which extends from the lower end of the bush up to the under side of flange $b$, as shown. The lower half or portion of this screw-thread is made in the form of a screw-tap, which is produced by forming a series of equidistant recesses, $e\ e$, having their lines or bottom surface preferably on a line tangent to the circumferential line of the bottom of the screw-thread, as shown in full and dotted lines $x$ in Fig. 2. They terminate abruptly at radial line $y$, as shown in the same figure, thereby giving to the cutting ends of the screw-tap threads at each recess $e$ a hook or saw form, while the recesses themselves gradually diminish in depth from the cutting ends of the tap-threads to the outer circumferential line of the same, as shown.

On the inner tapering side of the wall $a$, and at its lower end, there is provided a series of two or more projections, $d\ d$, extending inwardly about one-eighth of one inch from said wall, and upwardly from the lower end thereof about three-sixteenths of one inch, as illustrated in dotted lines $z$, Figs. 3 and 2. One of the functions of these projections is to give support to the wooden bung B from its lower end when driven home into the bush, as illustrated in Fig. 3. In this connection it co-operates with the tapering bore of the bush to resist the passage of the bung through the bush.

When the bung is made of soft wood, as in the partly-perforated or "tap" bungs illustrated in Fig. 3, (which are now generally used by the trade for facilitating the insertion of a faucet into the barrel,) the upper ends of the projections or spuds $d\ d$ are preferably made horizontal. In driving the soft-wood bung home, and in driving in the faucet, these horizontal upper ends prevent the bung from being forced into the barrel, and although entering the wood more or less have but little tendency to split the bung by forcing the wood fibers apart. The intermediate spaces between the projections permit access of the liquor to the wood, thereby causing the latter to swell equally and assist in maintaining the bung in place.

The projections form an absolutely reliable support for the bung against the extreme force applied in driving the faucet through its bottom $q$.

When it is intended to close the bush by a solid hard-wood bung, I make the upper ends of projections $d\ d$ to extend above line $z$ in a gradually tapering or pointed form, as shown by full and dotted lines in Fig. 3 and full lines in Fig. 4, so that the tapering upper ends of the projections will gradually wedge with the side and bottom of the bung at several points, and the bung will thereby have support from these projections in addition to that had from the tapering bore of the bush. The bung, moreover, being entered by the wedge-shaped projections, will pass farther into the bush until it has a tight fit therein. A second function of the projections is that in pitching barrels, which is generally effected by the action of hot air or steam introduced through the bung-bush, an annular space would be left between the nozzle of the injecting-pipe and the bore of the bush for the escape of the air within the barrel as the heating medium is being admitted, and of the excess of the latter. Another function of these projections *d* is to afford means for engagement of the bush with a dimension-wrench, *w*, Fig. 4, of a form adapted to freely enter the same and when revolved to bear against the projections. The projections are held unyieldingly before the applied force of the wrench by the wall *a* of the bush, with which they are integral; and when the wrench is revolved in a proper direction these projections (whether one or more) will operate, through the medium of wall *a*, to transfer the force from the wrench to the screw-tap portion of the tapering screw of the bush and cause the same to cut in the sides of the bung-hole a spiral groove, and also to force the taper of the continuous screw-threaded upper portion of the bush to wedge with the screw-threaded sides of the bung-hole and produce between the wood and the bush an absolutely water-tight joint.

I am aware that bung-bushes made with a tapering side wall, both with a plain screw-thread throughout and with continuous screw-thread in its upper portion and screw tap-threads in its lower portion, are old. I am also aware that it has been heretofore proposed to locate a single lug at the inner extremity of a bung-bush bore for engagement with a dimension-wrench. In such case, however, the lug was not intended to form a support for the bung, but was situated at a point below the inner end of the bung when the said bung was inserted in the bush, so as not to come in contact with the bung.

I claim—

1. A bung-bush having two or more inwardly-projecting studs situated within the lower end of the bore, the upper ends of said studs being in substantially the same plane, and the studs being of such size as to permit the bung to be driven partially past them while forming an equalized basal support for the bung, substantially as described.

2. A bung-bush having two or more inwardly-extending projections situated within the lower end of the bore, the upper ends of said projections inclining toward the wall of the bush, substantially as described.

3. A bung-bush having two or more inwardly-extending projections situated within the lower end of the bore, the upper ends of said projections inclining toward the wall of the bush, and being wedge-shaped, substantially as described.

4. A bung-bush having at the lower end of its bore a projection with a wedge-shaped upper end, substantially as described.

5. A bung-bush having at the lower end of its bore a projection whose upper end inclines toward the wall of the bush, substantially as described.

6. A bung-bush having at the lower end of its bore a projection whose upper end inclines toward the wall of the bush, and is wedge shaped, substantially as described.

WALTER CALHOUN.

Witnesses:
ALEX. SELKIRK, JR.,
FRANK SELKIRK.